Jan. 1, 1924 — W. A. CARMICHAEL — 1,479,026
VEHICLE DOOR HANDLE
Filed Sept. 14, 1921
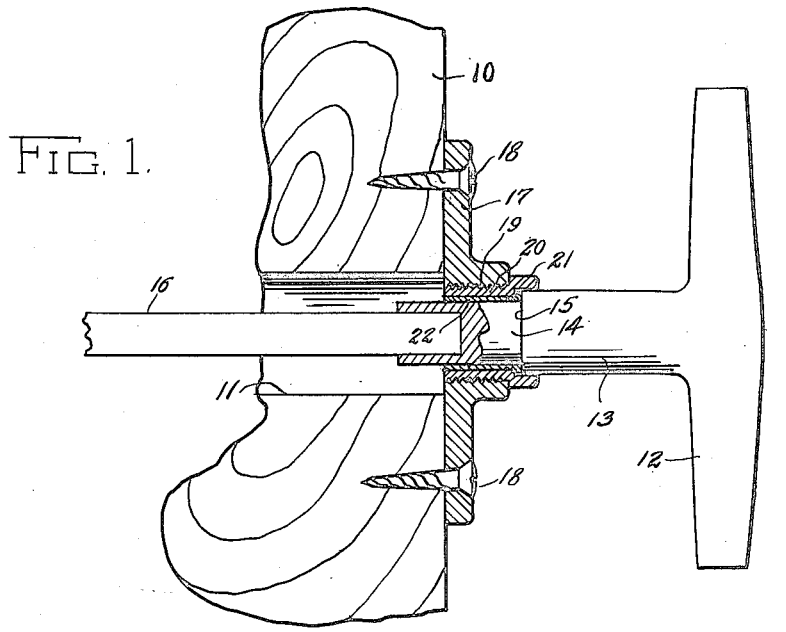
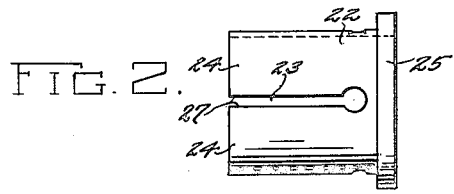
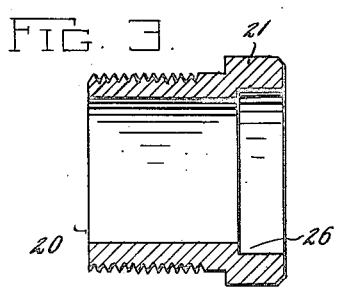 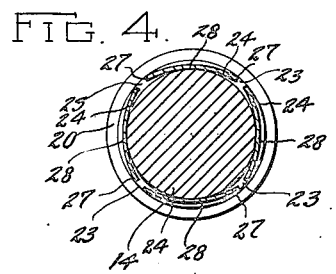
INVENTOR.
William A. Carmichael
BY
Wooster & Davis
ATTORNEYS.

Patented Jan. 1, 1924.

1,479,026

UNITED STATES PATENT OFFICE.

WILLIAM A. CARMICHAEL, OF NEW HAVEN, CONNECTICUT, ASSIGNOR TO C. COWLES AND COMPANY, OF NEW HAVEN, CONNECTICUT, A CORPORATION OF CONNECTICUT.

VEHICLE-DOOR HANDLE.

Application filed September 14, 1921. Serial No. 500,502.

*To all whom it may concern:*

Be it known that I, WILLIAM A. CARMICHAEL, a citizen of the United States, residing at New Haven, county of New Haven, State of Connecticut, have invented an Improvement in Vehicle-Door Handles, of which the following is a specification.

This invention relates to door handles and particularly to vehicle door handles and the means of mounting the same.

It has for an object to provide an operating handle and spindle for vehicle door locks which may at all times be easily turned in its bearing in the escutcheon but which will at all times have a sufficiently tight fit therewith, that is, it will never become loose or rattle under continued operation.

It is also an object of this invention to provide a device of this character which is simple in construction and easily fitted and which is not liable to get out of order.

Referring to the accompanying drawing, Fig. 1 is a vertical, central section through my device applied to a door.

Fig. 2 is a side elevation of the resilient sleeve removed, and on an enlarged scale.

Fig. 3 is a central, longitudinal section of the bearing bushing, and

Fig. 4 is a transverse section through the spindle and sleeve.

Reference numeral 10 indicates the usual vehicle door provided with an opening 11 for the lock operating mechanism which comprises a handle 12 having a stem 13 reduced at 14 to provide a shoulder 15 which coacts with other elements to limit the inward movement of handle and spindle. Connected to the reduced portion is the usual square lock operating rod 16. In this specification I term the stem and rod, the lock operating spindle. Embracing the spindle is the usual escutcheon secured to the face of the door by suitable screws 18. In the present instance the escutcheon includes the plate member 17 which is internally threaded at 19 to receive the second member of the escutcheon comprising a bearing bushing 20 provided with a flange 21 to limit its movement into the plate member 17. If preferred, instead of forming the escutcheon of two separate members, the bearing bushing may be omitted and the bearing for the spindle formed in the plate member.

Between the spindle and escutcheon, I mount a resilient sleeve 22 which is slotted longitudinally at 23 to form between the slots what are in effect sheet metal spring elements 24, these elements being connected at one end but disconnected at the opposite end. At the connected ends of the elements the sleeve is provided with an external flange 25 adapted to seat within the internal annular recess 26 in the bearing member of the escutcheon and retains the sleeve in position when the spindle is mounted in the lock, this flange 25 resting at its outer end against the shoulder 15 on the stem of the handle. The spring elements 24, when the spindle is removed, do not form a perfect circle but are flattened somewhat so that, when the spindle is inserted in the sleeve, the outer edges 27 will rest against the inner surface of the bearing and the central portion 28 between the edges 27 will rest against the outer surface of the spindle, and will be pressed outwardly thereby. This action is shown to a somewhat exaggerated extent in Fig. 4. It will be apparent from an inspection of this figure that, as the elements 24 are resilient, the edges 27 thereof will yieldingly press against the inner surface of the bearing, and that the central portion 28 will yieldingly press against the outer surface of the spindle causing a certain amount of friction thereon tending to prevent free turning of the spindle in the bearing, and the amount of friction will depend on the stiffness of these members and the amount they are flexed by insertion of the spindle. As they are yielding it will be clear the spindle will never bind in the bearing but may be turned at all times and that the spindle and the bearing do not have to be accurately machined to provide a uniformly operating spindle. The sleeve does not turn in the escutcheon in operation, but the spindle turns in the sleeve, so that the wear all comes on the sleeve and spindle.

It will be apparent from the foregoing description that the device is very simple in construction, involving but a single element over the handle having a spindle bearing directly in the escutcheon, but that unlike the latter construction does not have to be so accurately fitted in the escutcheon, and if it or the opening in the escutcheon is slightly out of round it will not bind as in the old construction. Furthermore, the spring elements will compensate for any wear and the device will not become loose and rattle after continued operation.

Having thus set forth the nature of my invention, what I claim is:

1. A device of the character described comprising a lock spindle, an escutcheon embracing the spindle and in which the spindle is adapted to rotate, and spring means between the spindle and escutcheon acting radially of the spindle and yieldingly reacting against both the spindle and the escutcheon.

2. A device of the character described comprising an escutcheon, a lock spindle mounted to turn in the escutcheon, and means between the spindle and escutcheon causing a yielding resistance to turning of said spindle, said means comprising a sheet metal spring element normally stationary with respect to one of the elements and pressing radially against the other element.

3. A device of the character described comprising an escutcheon, a lock operating spindle mounted to turn in said escutcheon, and a sheet metal spring element between the escutcheon and spindle and yieldingly pressing radially on the spindle and the escutcheon.

4. A device of the character described comprising an escutcheon, a lock operating spindle mounted to turn in said escutcheon, and a radially acting spring sleeve between the spindle and escutcheon and yieldingly reacting against both the spindle and the escutcheon.

5. A device of the character described comprising an escutcheon, a lock operating spindle mounted to turn in said escutcheon, and a longitudinally slotted resilient sleeve between the spindle and the escutcheon and yieldingly reacting against both the spindle and the escutcheon.

6. A device of the character described comprising an escutcheon, a lock operating spindle mounted to turn in said escutcheon, and a resilient sleeve between the escutcheon and spindle and yieldingly pressing against both the escutcheon and spindle in a directon radially of the axis of rotation.

7. A device of the character described comprising an escutcheon provided with a clyindrical bearing, a cylindrical lock operating spindle mounted to turn in said bearing, and a sheet metal spring element between the spindle and the escutcheon and resiliently pressing radially on both the spindle and the escutcheon.

8. A device of the class described comprising an escutcheon provided with a cylindrical bearing, a cylindrical lock operating spindle mounted to turn in said bearing, and a resilient longitudinally split sleeve between the escutcheon and spindle and yieldingly pressing against the escutcheon and the spindle in a direction radially of the axis of rotation.

9. A device of the character described comprising an escutcheon member, a lock operating spindle member mounted to turn in said escutcheon member, and a sheet metal spring element between the spindle and escutcheon extending longitudinally of the spindle, said spring element bearing at its longitudinal edges against one of said members and intermediate these edges against the other member.

10. A device of the character described comprising an escutcheon, a substantially cylindrical lock operating spindle mounted to turn in said escutcheon, and a resilient sleeve between the escutcheon and spindle, said sleeve being provided with longitudinal slots extending from one end thereof with the portions between the slots bearing at their edges against the escutcheon and intermediate these edges against the spindle.

In testimony whereof I affix my signature.

WILLIAM A. CARMICHAEL.